United States Patent [19]
Roche et al.

[11] Patent Number: 4,649,162
[45] Date of Patent: Mar. 10, 1987

[54] PROCESS FOR THE PREPARATION OF CELLULAR OR NONCELLULAR PLASTICS FROM AT LEAST TWO COMPONENTS WHICH REACT WITH ONE ANOTHER

[75] Inventors: Peter Roche, Munich; Mathaeus Rank, Olching/Neu-Esting, both of Fed. Rep. of Germany

[73] Assignee: BASF Aktiengesellschaft, Ludwigshafen, Fed. Rep. of Germany

[21] Appl. No.: 821,708

[22] Filed: Jan. 23, 1986

[30] Foreign Application Priority Data

Jan. 30, 1985 [DE] Fed. Rep. of Germany ....... 3502938

[51] Int. Cl.$^4$ ........................................... C08G 18/14
[52] U.S. Cl. ....................................... 521/78; 521/82; 521/133; 528/44; 528/48; 528/59; 528/67; 528/76; 528/77; 528/483
[58] Field of Search ............................ 521/78, 82, 133; 528/44, 48, 59, 67, 76, 77, 483

[56] References Cited

U.S. PATENT DOCUMENTS 3,755,212  8/1973  Dunlap et al. ...................... 521/133
3,821,130  6/1974  Barron et al. ...................... 521/133
4,546,118  10/1985  Simpson et al. ................... 521/133

Primary Examiner—Maurice J. Welsh
Attorney, Agent, or Firm—Norbert M. Lisicki; D. Barbara McKenzie-Wardell

[57] ABSTRACT

The invention relates to a process for the preparation of cellular or noncellular plastics, preferably polyurethane coatings, by reacting at least two components with one another, preferably organic polyisocyanates and polyhydroxyl compounds, by feeding the components into a mixing zone separately, and mixing them together and then discharging the reaction mixture from the mixing zone, while adding air heated to a temperature of 100° to 1200° C. to the reaction mixture as it emerges from the mixing zone.

10 Claims, No Drawings

PROCESS FOR THE PREPARATION OF CELLULAR OR NONCELLULAR PLASTICS FROM AT LEAST TWO COMPONENTS WHICH REACT WITH ONE ANOTHER

BACKGROUND OF THE INVENTION

1. Field of Invention

The present invention relates to a process for the preparation of cellular or noncellular plastics. More particularly, the invention relates to a process for the preparation of polyurethane coatings by reacting at least two components with each other, by feeding the components into a mixing zone separately, and mixing them together, then discharging the reaction mixture from the mixing zone while adding air heated to a temperature of 100° C. to 1200° C.

2. Description of Prior Art

In known processes for the preparation of cellular or noncellular plastics, the reaction components are usually injected into a mixing chamber from opposing directions. An individual nozzle must be present for each component. Disadvantages of this process result during mixing if one of the components must be injected at relatively low volumes compared to the others, or if there are great differences between the various injection pressures.

It is known that the ability of multi-component plastics to mix well is increased through the use of finely dispersed air. In order to accomplish this, air can be fed directly into the mixing chamber or fed into the component supply vessels and mixed there with the respective components. If air is added to the components in the supply reservoirs, mixing occurs very quickly, so that this method of adding air is largely ineffective. Adding air directly into the mixing chamber is also not completely satisfactory, since this frequently causes uneven or atomized flow out of the mixing chamber. This is a disadvantage when pouring must be accurate or in particular when vertical surfaces must be coated.

The coating of molds with polyurethane is also known from numerous publications. This may be accomplished, for example, by electrostatically applying hot-melt polyurethane elastomer powder to the inside surface of the mold, or heating the molding tool to the melting point of the elastomer in order to obtain a polyurethane layer. In a different method, sheets of polyurethane are placed in the mold and, if necessary, held on the surface of the mold by means of vacuum. The reactive polyurethane mixture is fed into the thus prepared mold and is allowed to cure in the closed mold. Processes are also known in which the inside surface of the mold is sprayed with a two-component polyurethane formulation. Here it takes a few minutes until a cured film has formed. A disadvantage here is that the polyurethane mixture can flow off on vertical surfaces, sharp corners, or chamfered edges—provided that outside force is not involved—before the mixture has cured sufficiently. Similar problems are encountered when the polyurethane mixture is diluted with inert solvents in order to achieve a low-viscosity, sprayable mixture or when the undiluted polyurethane mixture is applied by means of high-pressure airless spraying.

In order to avoid these disadvantages, it was proposed that agents be incorporated in the polyurethane mixtures to increase thixotropy—for example, silicone dioxide, polyamides, or polyacrylamides. However, this can adversely affect film formation, causing porous or streaked surfaces. In Federal Republic of Germany Offenlegungsschrift No. 29 32 315 (U.S. Pat. No. 4,294,880) primary aliphatic diamines are incorporated in the polyurethane composition in order to increase thixotropy. A lightfast polyurethane outer skin having a thickness of at least 0.5 mm, which cures relatively quickly, is obtained in accordance with Federal Republic of Germany OS No. 30 14 161 (U.S. Pat. No. 4,389,454) through the reaction of aliphatic polyisocyanates with a mixture of relatively high molecular weight polyhydroxyl compounds, low molecular weight chain extenders, and aliphatic and/or cycloaliphatic primary or secondary diamines in the presence of preferably synergistically acting combinations of catalysts. This last process produces good lightfast polyurethane coatings, but it is sensitive and requires high-quality processing.

Essentially two processes are available for spraying two-component polyurethane systems. In the so-called airless process, the initial components are mixed by means of a high pressure, counterflow process or in a static mixing tube and are then atomized by high pressure nozzles. In the so-called air-injection process, the initial components are mixed in static mixing tubes with a low pressure process or they are mixed in a mixing chamber using mechanical agitators. The component mixture is combined with air when it is discharged from the nozzle, which atomizes it. Since the time which the component mixture resides in the mixing chamber is relatively long, the pot time of the reaction mixture must be adjusted to be correspondingly long in order to prevent partial reaction of the mixture in the mixing chamber.

In order to achieve optimal mixing in the mixing chamber as well as good nozzle spraying, the reaction mixture must be adjusted to have as low a viscosity as possible, and preferably must possess a viscosity less than 400 m.Pa.s. A limited reduction in viscosity can be achieved in conventional processes by heating the initial components, preferably to temperatures from 30° to 80° C. However, increasing the temperatures significantly reduces the pot time of the reaction mixture. In order to prevent a buildup of material on the mixing equipment and nozzles, the hot, liquid reaction mixtures must not exhibit any increase in viscosity as a result of the reaction from the point they are mixed until they leave the nozzle. Moreover, they must have a pot time of at least 30 seconds.

Alternatively, the reaction mixture can be mixed with air when it leaves the mixing chamber, so that it is sprayed in the form of droplets. The addition of air cools the reaction mixture and lengthens pot time. A reaction mixture, for example, a two-component polyurethane system, sprayed onto vertical walls of molds as described above, results in a slow reaction at room temperature for layer thicknesses equal or greater to 0.3 mm which causes the reaction mixture to flow off the mold walls in an undesirable manner. In particular, "runs" form prior to the start of the curing phase on vertical surfaces, recesses, or sharp edges. If this sheeting or formation of "runs" in the layer of sprayed on reaction mixture is to be prevented, several relatively thin layers must be sprayed on separately and dried between sprayings. Such a process is labor-intensive and therefore expensive.

SUMMARY OF THE INVENTION

The objective of the invention at hand was to completely eliminate the disadvantages described above. This has been accomplished by the development of the process of the subject invention.

The invention herein disclosed is a process for preparing cellular or noncellular plastics from at least two components which react with one another wherein the components are fed separately into a mixing zone, mixed together in the mixing zone, and then discharged from the mixing zone, wherein air heated to a temperature of 100° C. to 1200° C. is added to the component mixture as it emerges from the mixing zone.

DESCRIPTION OF PREFERRED EMBODIMENT

In accordance with the subject invention, at least two components, preferably organic polyisocyanates and compounds having at least two reactive hydrogen atoms, are mixed intensively and sprayed with the aid of air in such a way that the reaction mixture is applied uniformly and that sheeting or the formation of "runs" is prevented.

In the preferred embodiments the air is heated to from 200° to 400° C., preferably from 280° to 320° C. The heated air is generally added at a pressure from 0.5 to 10 bar, preferably from 2 to 5 bar, and more preferably from 2.5 to 3.2 bar.

At the reaction conditions of the invention, the reaction mixture is uniformly atomized and is applied in a carefully designed spray configuration. No clogging of the nozzles was observed. The very slow formation of the addition polymerization products which first occurs in the mixing zone and then the accelerated formation which occurs after adding the heated air produces a rapid increase in viscosity, which improves leveling but prevents sheeting on vertical surfaces as well as the formation of "runs." The film which is formed has a uniform appearance.

The process of the invention is suitable for spraying various formulations of at least two reactive components which form high molecular weight, preferably urea, and/or in particular urethane group-containing polymers by means of the isocyanate addition polymerization process.

The process of the invention is preferably used for preparing polyurethane coatings by reacting a mixture comprising;

(a) an organic, optionally modified polyisocyanate,
(b) a relatively high molecular weight polyhydroxyl compound, and, optionally,
(c) a compound selected from the group consisting of a low molecular weight chain extender, crosslinking agent and a mixture thereof, in the presence of,
(d) a catalyst and, optionally,
(e) a solvent, and
(f) a compound selected from the group consisting of auxiliaries, additives, and mixtures thereof.

Component (a) and the optionally combined components (b) through (f) are added separately to a mixing zone, mixed, and then discharged from the mixing zone. Air heated to a temperature of from 100° to 1200° C., preferably from 200° to 400° C., and more preferably from 280° to 320° C., is combined with the mixture of components being discharged from the mixing zone. As already described, the heated air is generally fed in at a pressure of from 0.5 to 10 bar, preferably from 2 to 5 bar, more preferably from 2.5 to 3.2 bar.

The following is a discussion regarding the components which can be used for the process of the invention.

An organic polyisocyanate (a) can be used in accordance with the invention. In the formula $R(NCO)_n$, R represents polyfunctional, optionally, urethane, biuret, carbodiimide, and isocyanurate group-containing aliphatic, cycloaliphatic, araliphatic, or preferably aromatic radicals or mixed radicals of this type. N is a whole number whose value is equal to the valence of R and is at least 2, for example from 2 to 6, and preferably from 2 to 3. Typical individual examples include aliphatic diisocyanates such as ethylene diisocyanate, 1,2-propylene diisocyanate, 1,4-butylene diisocyanate, 2,2,4-trimethylhexamethylene-1,6-diisocyanate, 2-methylpentamethylene 1,5-diisocyanate, 2-ethylbutylene 1,4-diisocyanate, and preferably 1,6-hexamethylene diisocyanate, cycloaliphatic diisocyanates such as 1,2-cyclohexane diisocyanate, 1,4-cyclohexane diisocyanate, 1-methylcyclohexane 2,4-diisocyanate and 2,6-diisocyanate as well as corresponding isomer mixtures, 4,4'-, 2,4'-, and 2,2'-dicyclohexylmethane diisocyanate as well as corresponding isomer mixtures, and preferably 3-isocyanatomethyl 3,5,5-trimethylcyclohexylisocyanate, and polyisocyanates such as polycylohexyl-polymethylene polyisocyanates having from 2 to 6, preferably 3, cyclohexylene radicals in the molecule, and preferably aromatic polyisocyanates such as meta- or para-phenylene diisocyanate, biphenyl diisocyanate, 2,4- and 2,6-toluene diisocyanate and corresponding isomer mixtures, 4,4'-, 2,4'-, and 2,2'-diphenylmethane diisocyanate and corresponding isomer mixtures, mixtures of 4,4'-, 2,4'-, and 2,2'-diphenylmethane diisocyanates and polyphenyl polymethylene polyisocyanates (polymeric MDI) and mixtures of polymeric MDI and toluene diisocyanates.

Frequently so-called modified polyfunctional isocyanates are also used—in other words, products obtained through the chemical reaction of the above di-and/or polyisocyanates. Typical are di- and/or polyisocyanates containing ester, urea, biuret, allophanate, and preferably carbodiimide, isocyanurate, and/or urethane groups. Urethane group-containing aromatic polyisocyanates having isocyanate contents of 33.6 to 15 percent by weight, preferably from 31 to 21 percent by weight, for example 4,4'-diphenylmethane diisocyanate or toluene diisocyanate modified with low molecular weight diols, triols, dialkylene glycols, trialkylene glycols, or polyoxyalkylene glycols having molecular weights up to 800. The following are typically used as di- or polyoxyalkylene glycols, either individually or as mixtures; diethylene glycol, dipropylene glycol, polyoxyethylene glycol, polyoxypropylene glycol, and polyoxypropylene-polyoxyethylene glycols. Also suitable are isocyanate group-containing prepolymers having isocyanate contents of from 9 to 21 percent by weight, preferably from 21 to 14 percent by weight. Moreover, liquid carbodiimide group and/or isocyanurate ring-containing polyisocyanates having isocyanate contents from 15 to 33.6 percent by weight, preferably from 21 to 31 percent by weight have also been used successfully—for example—those based on 4,4'-, 2,4'-, and/or 2,2'-diphenylmethane diisocyanate and/or 2,4- and/or 2,6-toluene diisocyanate and more preferably 2,4- and 2,6-toluene diisocyanate as well as the corresponding isomer mixtures, 4,4'-, 2,4'-, and 2,2'-diphenylmethane diisocyanate as well as the corresponding isomer mixtures, for example from 4,4'- and 2,4'- diphenylmethane diisocyanates, mixtures of diphenylmethane diisocyanates and polyphenylpolymethylene polyisocyanates (polymeric MDI) and mixtures of toluene diisocyanates and polymeric MDI. Preferably, however, the following are used; urethane group, carbodiimide group, and-/or isocyanurate ring-containing polyisocyanates, for example those based on diphenylmethane diisocyanate and/or toluene diisocyanate, toluene diisocyanates, mixtures of polymeric MDI and toluene diisocyanates, and, in particular, mixtures of 4,4'- and 2,4'-diphenylmethane diisocyanates or mixtures of the isomers of diphenylmethane diisocyanate and polyphenyl-polymethylene polyisocyanates.

Preferably, a relatively high molecular weight polyhydroxyl compound (b) having a functionality of from 2 to 6, preferably from 2 to 3, and a molecular weight of from 800 to 8000, preferably from 1200 to 6000, are used. For example, the following are successfully used: polyether polyols, polyester polyols, polythioether polyols, optionally hydroxyl group-containing polyester amides, hydroxyl group-containing polyacetals, and hydroxyl group-containing aliphatic polycarbonates or mixtures of at least two of the polyhydroxyl compounds cited above. Polyester polyols and/or polyether polyols are preferably used, more preferably mixtures of di- and tri-functional polyether polyols having molecular weights from 800 to 8000 in weight ratios of 99:1 to 40:60, preferably in weight ratios of 90:10 to 50:50.

Suitable polyester polyols may be prepared, for example, from organic dicarboxylic acids having from 2 to 12 carbon atoms, preferably aliphatic dicarboxylic acids having from 4 to 6 carbon atoms, and polyfunctional alcohols, preferably diols, having from 2 to 12 carbon atoms, preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually and as mixtures with one another. Corresponding derivatives of the dicarboxylic acids may be used instead of the free dicarboxylic acids—for example, the dicarboxylic acid esters of alcohols having from 1 to 4 carbon atoms, or dicarboxylic anhydrides. Preferably, dicarboxylic acid mixtures of succinic, glutaric, and adipic acid are used in amounts of, for example, 20–35; 35–50; 20–32 parts by weight. Examples for di- and tri-functional alcohols, in particular diols, are ethanediol, diethylene glycol, 1,2-, respectively 1,3-propanediol, dipropylene glycol, 1,4-butanediol, 1,5-pentanediol, 1,6-hexanediol, 1,10-decanediol, glycerine, and trimethylolpropane. Preferably used are ethanediol, diethylene glycol, 1,4-butanediol, 1,5-pentanediol, 1,6-hexanediol, or mixtures of at least two of the cited diols, in particular mixtures of 1,4-butanediol, 1,5-pentanediol, and 1,6-hexanediol. In addition, polyester polyols derived from lactones may be used, for example, n-caprolactone, as may hydroxy carboxylic acids, for example, η-hydroxycaproic acid. The polyester polyols for example, ω-hydroxycaproic acid. The polyester polyols preferably have a functionality of from 2 to 3 and a molecular weight of from 800 to 3000, more preferably from 1800 to 2500.

However, preferably used as the polyhydroxyl compounds are polyether polyols produced with known methods, for example through anionic polymerization with alkali hydroxides such as sodium or potassium hydroxide, or alkali alcoholates such as sodium methylate, sodium or potassium methylate, or potassium isopropylate as catalysts on an initiator which contains bonded to the molecule from 2 to 6 reactive hydrogen atoms, preferably from 2 to 3, or through cationic polymerization with Lewis acids such as antimony pentachloride, boron fluoride etherate, etc. or bleaching earth as catalysts from one or more alkylene oxides having from 2 to 4 carbon atoms in the alkylene radical. Suitable alkylene oxides, are for example, tetrahydrofuran, 1,3-propylene oxide, 1,2- and 2,3-butylene oxide, styrene oxide, eipchlorohydrin, and preferably ethylene oxide and 1,2-propylene oxide. The ethylene oxides may be used individually, alternately one after another, or as mixtures.

Typical initiators are: water, organic dicarboxylic acids such as succinic acid, adipic acid, phthalic acid, and terephthalic acid, aliphatic and aromatic, optionally N-mono-, N-N- and N,N'-dialkyl-substituted diamines having from 1 to 4 carbon atoms in the alkyl radical such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,4- and 2,6-toluenediamine, and 4,4'-, 2,4'-, and 2,2'-diaminodiphenylmethane. The following may also be used as initiators: alkanolamines such as ethanolamine, diethanolamine, N-methyl- and N-ethylethanolamine, N-methyl-and N-ethyldiethanolamine, and triethanolamine, ammonia, and hydrazine. Preferably used are polyfunctional, more preferably di- and/or tri-functional alcohols such as ethanediol, 1,2- and 1,3-propanediol, diethylene glycol, dipropylene glycol, 1,4-butanediol, 1,6-hexanediol, glycerine, trimethylolpropane, pentaerythritol, and sorbitol.

The polyether polyols preferably possess a functionality of from 2 to 3 and molecular weights from 800 to 8000, preferably from 1200 to 6000, more preferably from 1800 to 4000. As with the polyester polyols, they may be used individually or in the form of mixtures. They may be also mixed with the polyester polyols as well as the hydroxyl group-containing polyacetals, polycarbonates, and/or polyester amides. Typical hydroxyl group-containing polyacetals which may be used are compounds which may be prepared from glycols such as diethylene glycol, triethylene glycol, 4,4'-dihydroxyethoxydiphenyldimethylmethane, hexanediol, and formaldehyde. Suitable polyacetals may also be prepared through the polymerization of cyclic acetals. Hydroxyl group-containing polycarbonates which may be used are those of the essentially known type prepared, for example, through the reaction of diols such as (1,3) propanediol, (1,4) butanediol, and/or (1,6) hexanediol, diethylene glycol, triethylene glycol, or tetraethylene glycol with diarylcarbonates, for example diphenylcarbonate, or phosgene.

Among the polyester amides are, for example, those obtained from polyfunctional saturated and/or unsaturated carboxylic acids or their anhydrides and polyfunctional saturated and/or unsaturated amino alcohols or mixtures of polyfunctional alcohols and amino alcohols and/or polyamines, primarily linear condensates.

Chain extenders and/or crosslinking agents (c) may optionally be used as well to prepare the polyurethane coatings. In order to properly adjust the desired mechanical properties, for example hardness, di-tetrafunctional, preferably difunctional compounds having molecular weights from 60 to 600, preferably from 60 to 300, may be used as the chain extenders and/or crosslinking agents, preferably, aliphatic, cycloaliphatic, or araliphatic diols having from 2 to 14, preferably 4 to 10 carbon atoms, triols having from 3 to 6 carbon atoms, and/or alkanolamines, preferably having molecular weights from 60 to 300 are preferably used. For example, N,N'-dialkyl-substituted aromatic diamines, which may optionally be substituted on the aromatic ring by alkyl radicals, and having from 1 to 10 carbon atoms in the N-alkyl radical, such as N,N'-diethyl, N,N'-disecdecyl-, N,N'-dicyclohexyl-para- or -meta-phenylenediamine, N,N'-dimethyl-, N,N'-diethyl-, and N,N'-diisopropyl-4,4'-diaminodiphenyl methane, and/or substituted primary aromatic diamines and/or polyamines having relatively high functionality and possessing at least one alkyl substituent in the ortho position relative to amino groups, which inhibit the reactivity of the amino group as a result of steric hindering, which are liquid at room temperature, and which are completely or at least partially miscible with the component (b) at the processing conditions. For example, 1-methyl- 3,5-diethyl-2,4-phenylenediamine, 2,4-dimethyl-6-tert-butyl-1,3-phenylenediamine, and/or 3,3', 5,5'-tetraisopropyl-4,4'-diaminodiphenylmethane may be used either alone or mixed with diols and/or triols. Typical diols or triols which are suitable are: ethylene glycol, 1,3- and 1,2-propanediol, 1,10-decanediol, ortho-meta-para-dihydroxycyclohexane, diethylene glycol, dipropylene glycol, 1,2,4-, 1,3,5-trihydroxycyclohexane, glycerine and trimethylolpropane as well as low molecular weight polyoxyalkylene polyols based on ethylene and/or 1,2-propylene oxide and the above-cited diols and/or triols may be used as initiators, preferably 1,4-butanediol, 1,6-hexanediol, and bis(2-hydroxyethyl) hydroquinone. For example, the following alkanolamines have proved effective; ethanolamine, diethanolamine, triethanolamine, N-methyldiethanolamine, dipropanolamine, tripropanolamine, hexanolamine, dihexanolamine, and trihexanolamine.

If chain extenders and/or crosslinkers or their mixtures are used in the process of the invention, such substances are used in amounts from 0 to 22 percent by weight, preferably from 1 to 15 percent by weight based on the weight of the relatively high molecular weight polyhydroxyl compounds (b).

Tertiary amines that have proven to be effective catalysts (d) include, for example, triethylamine, tributylamine, dimethylbenzylamine, N-methyl-, N-ethyl-, N-cyclohexylmorpholine, N,N,N',N'-tetramethylethylenediamine, N,N,N', N'-tetramethylbutanediamine, pentamethyldiethylenetriamine, tetramethyldiaminoethylether, bis(dimethylaminopropyl)urea, dimethylpiperazine, 1,2-dimethylimidazol, 1-azabicyclo(3.3.0)octane and preferably 1,4-diazabicyclo(2.2.2)-octane, and polyalkanolamine compounds such as triethanolamine, diisopropanolamine, N-methyl- and N-ethyldiethanolamine, and dimethylethanolamine.

Particularly effective and therefore preferred for use as catalysts (d) are organic and/or inorganic metal compounds which do not develop their full catalytic effectiveness until temperatures greater than 40° C. are reached, preferably temperatures between 60° and 160° C. Typical examples of such organic and inorganic metal compounds are inorganic metal salts such a the chlorides of 2- and 3-valent iron, 3- and 4-valent tin, zinc, cadmium, and 2-valent mercury, metal carbonyls such as iron or nickel carbonyl, and organic complexing or chelating agents such as those which may be obtained from acetalacetone, benzoilacetone, trifluoroacetalacetone, acetoacetate, salicylaldehyde, or cyclopentanone-2-carboxylic ethyl ester and various metals such as beryllium, magnesium, copper, zinc, cadmium, mercury, titanium, zirconium, tin, vanadium, antimony, chrome, molybdenum, tungsten, manganese, iron, cobalt, nickel, or metal oxide compounds such as $MoO_2^{2+}$, $VO^{2+}$, whereby partially substituted metal complexes such as dioctyl tin dilaurate, $SnCl_2$ (acetylacetonate), or $SbCl_4$ (acetylacetonate) may be used. For complexing, the corresponding amines may be used instead of the Keto compounds cited above as the complexing agents, for example, acetalacetone amines, bis-acetalacetone alkylene diamines, and salicylaldehyde amines. Also suitable are the metal complexes of the porphyrines, prophyrazines, or phenolates. Preferably used are the acetalacetonates of iron, cobalt, zirconium, manganese, vanadium, zinc, tin, antimony, and titanium. The amount of catalyst to be used depends on its effectiveness. On the one hand it should produce a satisfactory film and on the other hand should not cause too rapid an increase in viscosity, which is associated with line clogging. For example, amounts of catalyst or catalyst combination ranging from 0.001 to 5 percent by weight, preferably from 0.05 to 2 percent by weight, based on the weight of the polyhydroxyl compound (b) have been found to be effective.

Solvents (e) and auxiliaries and/or additives (f) may also be incorporated in the reaction mixture.

Preferably the initial components used to prepare the polyurethane coatings of the process of the invention are reacted with one another in the absence of organic solvents. However, it may optionally be desirable to dilute the reaction mixture with an inert solvent (e) in order to lower viscosity. Typical inert solvents which are suitable are aromatic compounds such as benzene, toluene, or xylene, ketones such as acetone or methyl ethyl ketone, esters such as butyl or ethyl acetate, tetrahydrofuran or dioxan, and dimethylformamide as well as mixtures of such solvents. The type and amount of the solvent is preferably selected such that the heated air causes the solvent to evaporate either completely or partially, but preferably completely, before the sprayed reaction mixture strikes the surfaces of the mold.

As already discussed, additives and/or auxiliaries (f) can also be incorporated into the reaction mixture. Typical examples are surfactants, fillers, colors, pigments, flame retardants, agents to protect against hydrolysis, fungistats, and bacteriostats. Further details on the auxiliaries and additives cited above as well as other such substances are found in the technical literature, for example the monograph by J. H. Saunders and K. C. Frisch, *Polyurethanes,* parts 1 and 2, Vol. 16 of *High Polymers,* (Interscience Publishers: 1962, 1964), or *Polyurethane,* Vol. 7 of the *Kunststoff-Handbuch,* 1st and 2nd Eds. (Munich: Carl Hanser Verlag, 1966, 1983).

In the process of the invention it is best for cost reasons to use air to spray the flowability reaction mixture. However, the term air is understood to include other gases, preferably gases which are inert at the reaction conditions—for example nitrogen, helium, neon, and other noble gases or their mixtures, whereby nitrogen is preferably used at temperatures above 700° C. instead of air.

In order to prepare the polyurethane coatings, the organic polyisocyanate (a), relatively high molecular weight polyhydroxyl compound (b), and optionally low molecular weight chain extender and/or crosslinking agent (c) are used in such amounts that the equivalent ratio of isocyanate groups in the polyisocyanate (a) to the total number of reactive hydrogen atoms in component (b) and optionally (c) is from 1:0.85 to 1:1.25, preferably from 1:0.95 to 1:1.15, more preferably from 1:0.98 to 1:1.05.

When a mixing chamber having several feed nozzles is used, the initial components may be fed in individually and mixed intensively in the mixing chamber. It has been found to be particularly advantageous to use a two-component system and to combine the b, d, and optionally c, e, and f components in an A component and to use the organic polyisocyanates of component (a) as the B component. In order to obtain a reaction mixture which has a relatively long "open" time—as a rule this is best between 30 and 60 seconds—the initial components are preferably mixed at temperatures from 18° to 30° C. However, it is best to avoid temperatures above 60° C. The reaction mixture which leaves the mixing zone, which has a viscosity of approximately 50 to 15,000 m.Pa.s at 25° C., preferably from 80 to 4000 m.Pa.s, is combined with heated air, and is sprayed with a spray nozzle. When using a nozzle whose opening diameter is 1.5 mm and with an air pressure of 3.5 bar, the discharge rate of the spray equipment is approximately 100 to 600 g/minute. The atomization of the reaction mixture with heated air causes the mixture to heat almost immediately. A significant reduction in the viscosity of the reaction mixture occurs, which produces an extremely fine spray pattern. Moreover, the addition of heat and the heated air causes the addition polymerization reaction to start immediately and also causes the solvent to evaporate. This achieves a rapid increase in viscosity, so that the sprayed reaction mixture already begins to react when it strikes the surface being sprayed, which means that heating and other undesirable effects, such as the formation of "runs" do not occur when relatively thick layers are formed, for example, those of thicknesses from 0.3 to 2 mm and greater.

The following examples serve to more fully explain the process of the invention.

EXAMPLE 1

A Component: Mixture of
86.7 parts by weight of a 1,4-butanediol/1,5-pentanediol/1,6-hexanediol polyadipate having a hydroxyl number of 56,
8.0 parts 1,4-butanediol,
1.0 parts triethylenediamine (33 percent by weight solution in diethylene glycol),
4.0 parts zeolite paste and,
0.3 parts silicone oil as a foam suppressant.

B Component: Dipropylene glycol-modified 4,4'-diphenylmethane diisocyanate having an isocyanate content of 23 percent by weight and a viscosity of 700 m.Pa.s at 25° C.

Procedure: 100 parts by weight of the A component and 54 parts by weight of the B component—corresponding to an isocyanate index of 104—were fed into the mixing zone via a set of gears whose pumping output could be controlled by the rotational speed of an adjustable motor. The components were mixed in a Spritztechnik AG, Switzerland, low pressure machine, which was designed as a mixing gun. The mixing gun had a compressed-air driven mechanical stirrer and a spray nozzle with external mixing. The spray air was heated to 370° C. by heat exchanger and was fed in at a pressure of 3.3 bar. The heated air was incorporated into the discharging reaction mixture in the spray nozzle downstream from the mixing chamber. The air consumption was 350 l/minute and the rate of discharge was approximately 420 g/minute.

The surface was sprayed at a distance of 0.3 to 0.8 m at a spray angle of from 0° to 70° C.

EXAMPLE 2

The same procedure used in Example 1 was followed.

A Component: Mixture of
60.3 parts by weight of a polyoxypropylene/polyoxyethylene glycol having a hydroxyl number of 29,
20.0 parts by weight of a polyoxyalkylene triol prepared from trimethylolpropane as an initiator and 1,2-propylene oxide/ethylene oxide having a hydroxyl number of 27,
10.0 parts by weight 1,4-butanediol,
1.2 parts by weight triethylenediamine (33 percent by weight solution in diethylene glycol),
0.1 part by weight dioctyl tin dilaurate, and
5.0 parts by weight zeolite paste.

B Component: A urethane group-modified mixture of diphenylmethane diisocyanates and polyphenyl/polymethylene polyisocyanates having an isocyanate content of 28 percent by weight, and a viscosity of 170 m.Pa.s at 25° C.

The A and B components were mixed at a weight ratio of 100:40, corresponding to an isocyanate index of 110.

EXAMPLE 3

A Component: Mixture of
51.0 parts by weight of a mixture of a cyclohexanone condensation product and ester oil having a hydroxyl number of 165,
15.0 parts by weight of a tetrafunctional polyoxypropylene polyol having a hydroxyl number of 470, prepared by using ethylene diamine as an initiator,
0.15 parts by weight dioctyl tin dilaurate,
3.0 parts by weight zeolite paste,
0.3 parts by weight silicone oil,
22.7 parts by weight barium sulphate,
5.0 parts by weight iron oxide black, and
2.8 parts by weight silicone oxide.

B Component: Urethane group-containing polyisocyanate mixture having an isocyanate content of 25.5 percent by weight, prepared through the reaction of a mixture of diphenylmethane diisocyanates and polyphenyl/polymethylene polyisocyanates with a polyoxypropylene/polyoxyethylene glycol having a hydroxyl number of 29.

The A and B components were mixed at a weight ratio of 100:48 parts, corresponding to an isocyanate index of 110. Spraying was performed as described in Example 1.

The embodiments of the invention in which an exclusive privilege or property is claimed are defined as follows:

1. A process for the preparation of cellular or noncellular plastics by reacting at least two components with each other, by feeding the components into a mixing zone separately, and mixing them together, then discharging the reaction mixture from the mixing zone while adding air heated to a temperature of 100° C. to 1200° C. to the reaction.

2. The process of claim 1 wherein the air is fed into said mixing zone at a pressure of from 0.5 to 10 bar.

3. The process of claim 1 wherein the air has a temperature of from 200° C. to 400° C. and is fed in at a pressure of from 2.0 to 5.0 bar.

4. A process for the preparation of urethane coatings by reacting a mixture of:
 (a) an organic polyisocyanate,
 (b) a relatively high molecular weight polyhydroxyl compound and, optionally,
 (c) a low molecular weight chain extender or cross-linking agent, in the presence of,
 (d) a catalyst and optionally,
 (e) a solvent, and
 (f) an auxiliary, and/or additive,
comprising feeding component (a) and optionally combined components (b) through (f) into a mixing zone separately, mixing said components and then discharging a mixture from the mixing zone while adding air, wherein the air has a temperature of from 100° C. to 1200° C. and is combined with the reaction mixture leaving the mixing zone.

5. The process of claim 4 wherein the air is fed in at a pressure of from 0.5 to 10 bar.

6. The process of claim 4 wherein the air has a temperature of from 200° C. to 400° C. and is fed in at a pressure of 2.0 to 5.0 bar.

7. The process of claim 4 wherein the organic polyisocyanate is selected from the group consisting of an aromatic, modified urethane and mixtures thereof, isocyanate, carbodiimide group-containing aromatic polyisocyanates and mixtures thereof.

8. The process of claim 4 wherein a relatively high molecular weight polyhydroxyl compound is selected from the group consisting of difunctional and trifunctional polyether polyols having molecular weights from 800 to 8000, preferably mixtures thereof.

9. The process of claim 4 wherein a catalyst is selected from the group consisting of organic or inorganic metal compounds which do not develop their full catalytic affect until temperatures above 40° C.

10. The process of claim 4 wherein the reaction occurs in the absence of organic solvents.

* * * * *